(12) United States Patent
Gioia et al.

(10) Patent No.: US 12,132,933 B2
(45) Date of Patent: Oct. 29, 2024

(54) METHOD AND DEVICE FOR CODING A DIGITAL HOLOGRAM SEQUENCE

(71) Applicant: FONDATION B-COM, Cesson-Sévigné (FR)

(72) Inventors: Patrick Gioia, Servon-sur-Vilaine (FR); Antonin Gilles, Rennes (FR)

(73) Assignee: FONDATION B-COM, Cesson-Sévigné (FR)

( * ) Notice: Subject to any disclaimer, the term of this patent is extended or adjusted under 35 U.S.C. 154(b) by 366 days.

(21) Appl. No.: 17/624,748

(22) PCT Filed: Jun. 24, 2020

(86) PCT No.: PCT/EP2020/067744
§ 371 (c)(1),
(2) Date: Jan. 4, 2022

(87) PCT Pub. No.: WO2021/004797
PCT Pub. Date: Jan. 14, 2021

(65) Prior Publication Data
US 2022/0272380 A1 Aug. 25, 2022

(30) Foreign Application Priority Data
Jul. 5, 2019 (FR) .................................. 1907555

(51) Int. Cl.
*H04N 19/597* (2014.01)
*G03H 1/08* (2006.01)
(Continued)

(52) U.S. Cl.
CPC ......... *H04N 19/597* (2014.11); *G03H 1/0841* (2013.01); *H04N 19/119* (2014.11);
(Continued)

(58) Field of Classification Search
CPC .. H04N 19/597; H04N 19/119; H04N 19/137; H04N 19/18; H04N 19/63;
(Continued)

(56) References Cited

U.S. PATENT DOCUMENTS 6,621,605 B1 * 9/2003 Grossetie ................. G03H 1/26
359/9
7,277,209 B1 * 10/2007 Grossetie ................. G03H 1/08
359/9
(Continued)

OTHER PUBLICATIONS

Sivaramakrishnan et al., "A uniform transform domain video codec based on dual tree complex wavelet transform", 2001 IEEE International Conference on Acoustics, Speech, and Signal lprocessing. Proceedings, May 7-11, 2001, vol. 3, May 7, 2001 (May 7, 2001), pp. 1821-1824 (Year: 2001).*
(Continued)

*Primary Examiner* — Van D Huynh
(74) *Attorney, Agent, or Firm* — NIXON & VANDERHYE

(57) ABSTRACT

Disclosed is a method and a device for coding a sequence including first and second digital holograms representing respective scenes, the digital holograms being represented by a set of wavelets each defined by a multiplet of coordinates in multidimensional space. The first and second holograms are represented by first and second coefficients respectively associated with wavelets. The coding method includes the following steps: for each second coefficient, determining a remainder by a difference between the second coefficient concerned, associated with a first wavelet defined by a given multiplet, and the first coefficient) associated with a second wavelet defined by a multiplet having as its image the multiplet by a transform in the multidimenisonal space; coding the determined remainders. The transform is determined by analysis of variation between the first scene
(Continued)

represented by the first digital hologram and the second scene represented by the second digital hologram.

20 Claims, 3 Drawing Sheets

(51) Int. Cl.
*H04N 19/119* (2014.01)
*H04N 19/137* (2014.01)
*H04N 19/18* (2014.01)
*H04N 19/63* (2014.01)

(52) U.S. Cl.
CPC ........... *H04N 19/137* (2014.11); *H04N 19/18* (2014.11); *H04N 19/63* (2014.11); *G03H 2226/02* (2013.01)

(58) Field of Classification Search
CPC ...... H04N 19/20; H04N 19/547; H04N 19/61; G03H 1/0841; G03H 2226/02; G03H 1/08

See application file for complete search history.

(56) References Cited

U.S. PATENT DOCUMENTS

| | | | | |
|---|---|---|---|---|
| 2003/0128760 | A1* | 7/2003 | Lee | H04N 19/619 375/E7.113 |
| 2004/0021917 | A1* | 2/2004 | Plesniak | G03H 1/0808 359/9 |
| 2008/0025624 | A1* | 1/2008 | Brady | H04N 19/00 382/238 |
| 2009/0213443 | A1* | 8/2009 | Kang | H04N 19/90 359/29 |
| 2011/0032994 | A1* | 2/2011 | Bar-On | H04N 19/647 375/240.19 |
| 2012/0213447 | A1* | 8/2012 | Prakash | H04N 19/50 382/232 |
| 2015/0029566 | A1* | 1/2015 | Gioia | G03H 1/0808 359/9 |
| 2016/0327905 | A1* | 11/2016 | Gioia | G03H 1/0005 |
| 2018/0267465 | A1* | 9/2018 | Viswanathan | G03H 1/0808 |
| 2021/0058639 | A1* | 2/2021 | Blinder | H04N 19/543 |

OTHER PUBLICATIONS

International Search Report for PCT/EP2020/067744, mailed Sep. 18, 2020, 7 pages.

Written Opinion of the ISA for PCT/EP2020/067744, mailed Sep. 18, 2020, 9 pages.

Siv Aramakrishnan et al., "A uniform transform domain video codec based on dual tree complex wavelet transform", 2001 IEEE International Conference on Acoustics, Speech, and Signal Processing. Proceedings, May 7-11, 2001, vol. 3, May 7, 2001 (May 7, 2001), pp. 1821-1824.

Sim et al., "Reconstruction Depth Adaptive Coding of Digital Holograms", IE/CE Transactions on Fundamentals of Electronics, Communications and Computer Sciences, Engineering Sciences Society, vol. E95A, No. 2, Feb. 1, 2012, pp. 617-620.

Blinder et al., "Signal processing challenges for digital holographic video display systems", Signal Processing. Image Communication., vol. 70, Oct. 4, 2018, pp. 114-130.

Anas et al., "View-dependent compression of digital hologram based on matching pursuit", Proceedings of SPIE; {Proceedings of SPIE ISSN 0277-786X vol. 10524], SPIE, US, vol. 10679, May 24, 2018, pp. 106790L-106790L.

Blinder et al., "Global motion compensation for compressing holographic videos" Optics Express, vol. 26, No. 20, Sep. 17, 2018, pp. 25524-25533.

Fonseca et al., "Comparative analysis of autofocus functions in digital in-line phase-shifting holography", *Applied Optics*, vol. 55, No. 27, Sep. 20, 2016, pp. 7663-7674.

Magarey et al., "Motion Estimation Using a Complex-Valued Wavelet Transform", IEEE *Transactions on Signal Processing*, vol. 46, No. 4, Apr. 1, 1998.

Peixeiro et al., "Holographic Data Coding: Benchmarking and Extending HEVC with Adapted Transforms", IEEE Transactions on Multimedia, Feb. 2018, vol. 20, No. 2, pp. 282-297 [submission pending].

Kambhamettu et al., "A Hierarchical Method for 3D Rigid Motion Estimation", ACCV 2006, Lecture Notes in Computer Science, vol. 3852 [submission pending].

MacQueen, "Some Methods for Classification and Analysis of Multivariate Observations", Proceedings of the Fifth Berkeley Symposium on Mathematical Statistics and Probability, University of California, Berkeley, vol. 1, Statistics, pp. 281-297 [submission pending], 1967.

Peixeiro et al., "Holographic Data Coding: Benchmarking and Extending HEVC with Adapted Transforms," IEEE Transactions on Multimedia, Feb. 2018, vol. 20, No. 2, pp. 282-297.

Srinark et al., "A Hierarchical Method for 3D Rigid Motion Estimation," ACCV 2006, Lecture Notes in Computer Science, vol. 3852, 2006, pp. 791-800.

MacQueen, "Some Methods for Classification and Analysis of Multivariate Observations," Proceedings of the Fifth Berkeley Symposium on Mathematical Statistics and Probability, University of California, Berkeley, vol. 1, 1967, Statistics, pp. 281-297.

* cited by examiner

METHOD AND DEVICE FOR CODING A DIGITAL HOLOGRAM SEQUENCE

This application is the U.S. national phase of International Application No. PCT/EP2020/067744 filed 24 Jun. 2020, which designated the U.S. and claims priority to FR Patent Application No. 1907555 filed 5 Jul. 2019, the entire contents of each of which are hereby incorporated by reference.

BACKGROUND OF THE INVENTION

Field of the Invention

The present invention relates to the technical field of digital holography.

More particularly, it relates to a method and a device for encoding a digital hologram sequence.

Description of the Related Art

It has already been proposed, for example in the article "*View-dependent compression of digital hologram based on matching pursuit*", by Anas El Rhammad, Patrick Gioia, Antonin Gilles, Marco Cagnazzo and Beatrice Pesquet-Popescu in Optics, Photonics, and Digital Technologies for Imaging Applications V. International Society for Optics and Photonics, 2018, vol. 10679, p. 106790L, to represent a digital hologram by means of a set of wavelets (for example Gabor wavelets).

Each wavelet is defined by several parameters characteristic of the wavelet concerned. The digital hologram is then represented by a set of coefficients respectively associated with the different wavelets.

The digital hologram can thus be easily reconstructed by summing the different wavelets, each time weighted by the associated coefficient.

SUMMARY OF THE INVENTION

In this context, the present invention proposes a method for encoding a sequence comprising at least a first digital hologram representing a first scene and a second digital hologram representing a second scene, the first digital hologram and the second digital hologram being represented by means of a set of wavelets each defined by a multiplet of coordinates in a multidimensional space,
- the first hologram being represented by a set of first coefficients respectively associated with certain at least of the wavelets of said set of wavelets and the second hologram being represented by a set of second coefficients respectively associated with certain at least of the wavelets of said set of wavelets,
- the encoding method comprising the following steps:
- for each of a plurality of second coefficients, determining a residual by difference between the second coefficient concerned, associated with a first wavelet defined by a given multiplet, and the first coefficient associated with a second wavelet defined by a multiplet having for image the given multiplet by a transform in the multidimensional space;
- encoding the determined residuals,
- wherein the transform is determined by analysis of variation between the first scene represented by the first digital hologram and the second scene represented by the second digital hologram.

The transform makes it possible to assign certain at least of the first coefficients to wavelets other than those to which these first coefficients are assigned in the first hologram.

This transform thus makes it possible to construct (at least in part) a predicted hologram, which can be subtracted from the second hologram (coefficient by coefficient) in order to obtain residuals of lower value, whose encoding is more efficient.

Moreover, due to the fact that the transform is determined by analysis of variation between the first scene represented by the first digital hologram and the second scene represented by the second digital hologram, the predicted hologram will be as close as possible to the second hologram. This variation can correspond in practice to the movement of an object between the first scene and the second scene.

It can further be provided, for at least one second coefficient outside of said plurality of second coefficients, a step of determining a residual by difference between this second coefficient, associated with a third wavelet defined by another given multiplet, and the first coefficient associated with a fourth wavelet defined by another multiplet having for image the other given multiplet by another transform in the multidimensional space.

Another transform is thus used for other second coefficients, which makes it possible to refine the prediction of the second hologram by means of the first hologram.

This other transform is for example determined by analysis of another variation between the first scene and the second scene. This other variation can correspond in practice to the movement of another object (different from the above-mentioned object) between the first scene and the second scene.

The encoding method can moreover comprise the following steps:
- distributing a part at least of the wavelets into different groups of wavelets respectively associated with different parts of the first scene or the second scene;
- determining a transform of the multidimensional space for each group of wavelets;
- for each of the second coefficients of a given group of wavelets, determining a residual by difference between the second coefficient concerned, associated with a fifth wavelet defined by a given multiplet, and the first coefficient associated with a sixth wavelet defined by a multiplet having for image this given multiplet by the transform associated with the given group of wavelets.

The above-mentioned transform can be determined in practice as a function of a movement, between the first scene and the second scene, of a set of connected points (set of points called "connected component" in the following description).

The transform can be determined, for example, on the basis of three-dimensional representations of the first scene and of the second scene.

According to another possible embodiment, the encoding method can comprise the following steps:
- constructing a first depth map by means of the first digital hologram;
- constructing a second depth map by means of the second digital hologram;
- determining the transform on the basis of the first depth map and the second depth map.

According to a possible embodiment, the depth being defined in a given direction (here, a given direction of the three-dimensional space containing the scene represented by the first digital hologram), the step of constructing the first depth map (and/or the step of constructing the second depth map) can comprise the following steps:

reconstructing, by means of the first digital hologram (or, depending on the case, by means of the second digital hologram), the light field at a plurality of points;

for each of a plurality of depths, segmenting the points associated with the depth concerned into a plurality of segments, and determining values of a sharpness metric respectively associated with said segments on the basis of the light field reconstructed on the segment concerned;

for each element of the first (or second, depending on the case) depth map, determining the depth for which the sharpness metric is maximum among a set of segments aligned along said given direction and respectively associated with the different depths of the plurality of depths (the so-determined depth can thus be associated with the element concerned of the first depth map or, depending on the case, of the second depth map).

As described hereinafter, the coordinates of said multidimensional space can represent respectively a parameter representative of a first spatial coordinate in the plane of the hologram, a parameter representative of a second spatial coordinate in the plane of the hologram, a spatial frequency dilation parameter and an orientation parameter.

The invention also proposes a device for encoding a sequence comprising at least a first digital hologram representing a first scene and a second digital hologram representing a second scene, the first digital hologram and the second digital hologram being represented by means of a set of wavelets each defined by a multiplet of coordinates in a multidimensional space, the encoding device comprising:

a unit for storing a set of first coefficients, respectively associated with certain at least of the wavelets of said set of wavelets, and a set of second coefficients, respectively associated with certain at least of the wavelets of said set of wavelets, the set of first coefficients representing the first digital hologram and the set of second coefficients representing the second digital hologram;

a unit for determining, for each of a plurality of second coefficients, a residual by difference between the second coefficient concerned, associated with a first wavelet defined by a given multiplet, and the first coefficient associated with a second wavelet defined by a multiplet having for image the given multiplet by transform in the multidimensional space;

a unit for encoding the determined residuals, wherein the determination unit is designed to determine the transform by analysis of variation between the first scene represented by the first digital hologram and the second scene represented by the second digital hologram.

The determination unit and the encoding unit can for example be implemented in practice by means of a processor of the encoding device, this processor being programmed (for example, by means of computer program instructions stored in a memory of the encoding device) to implement respectively the steps of determining the residuals and the step of encoding the residuals.

The invention moreover proposes, independently, a method for distributing coefficients respectively associated with wavelets into a plurality of sets of coefficients, the coefficients associated with the wavelets representing a digital hologram intended to reproduce a scene comprising a plurality of parts, the method comprising the following steps implemented for each of a plurality of said coefficients:

determining a straight line corresponding to the light ray represented by the wavelet associated with the coefficient concerned;

assigning the coefficient concerned to a set associated with the part of the scene passed through by the determined straight line.

When each wavelet is defined by a multiplet of coordinates in a multidimensional space, the straight line can be determined using the coordinates of this multiplet.

For example, when these coordinates (defining the wavelet) comprise a first spatial coordinate in the plane of the hologram, a second spatial coordinate in the plane of the hologram, a spatial frequency dilation parameter and an orientation parameter, the orientation of the straight line corresponding to the light ray represented by the wavelet is determined as a function of the dilation parameter and the orientation parameter and/or the position of the straight line corresponding to the light ray represented by the wavelet is determined as a function of these first and second spatial coordinates.

The invention finally proposes, here again independently, a method for constructing a depth map related to a scene represented by a digital hologram, the depth being defined in a given direction of space (here, the three-dimensional space containing the scene), the method comprising the following steps:

reconstructing, by means of the digital hologram, the light field at a plurality of points in space;

for each of a plurality of depths, segmenting the points associated with the depth concerned into a plurality of segments, and determining values of a sharpness metric respectively associated with said segments on the basis of the light field reconstructed on the segment concerned (that is to say on the basis of the reconstructed light field values relative to the points of the segment concerned);

for each element of the depth map, determining the depth for which the sharpness metric is maximum among a set of segments aligned along said given direction and respectively associated with the different depths of the plurality of depths, and associating the so-determined depth with this element.

When the digital hologram is represented by coefficients respectively associated with wavelets, the light field reconstruction is made by means of these coefficients.

Of course, the different features, alternatives and embodiments of the invention can be associated with each other according to various combinations, insofar as they are not mutually incompatible or exclusive.

SUMMARY OF THE INVENTION

Moreover, various other features of the invention will be apparent from the appended description made with reference to the drawings that illustrate non-limitative embodiments of the invention, and wherein.

Figure 4:
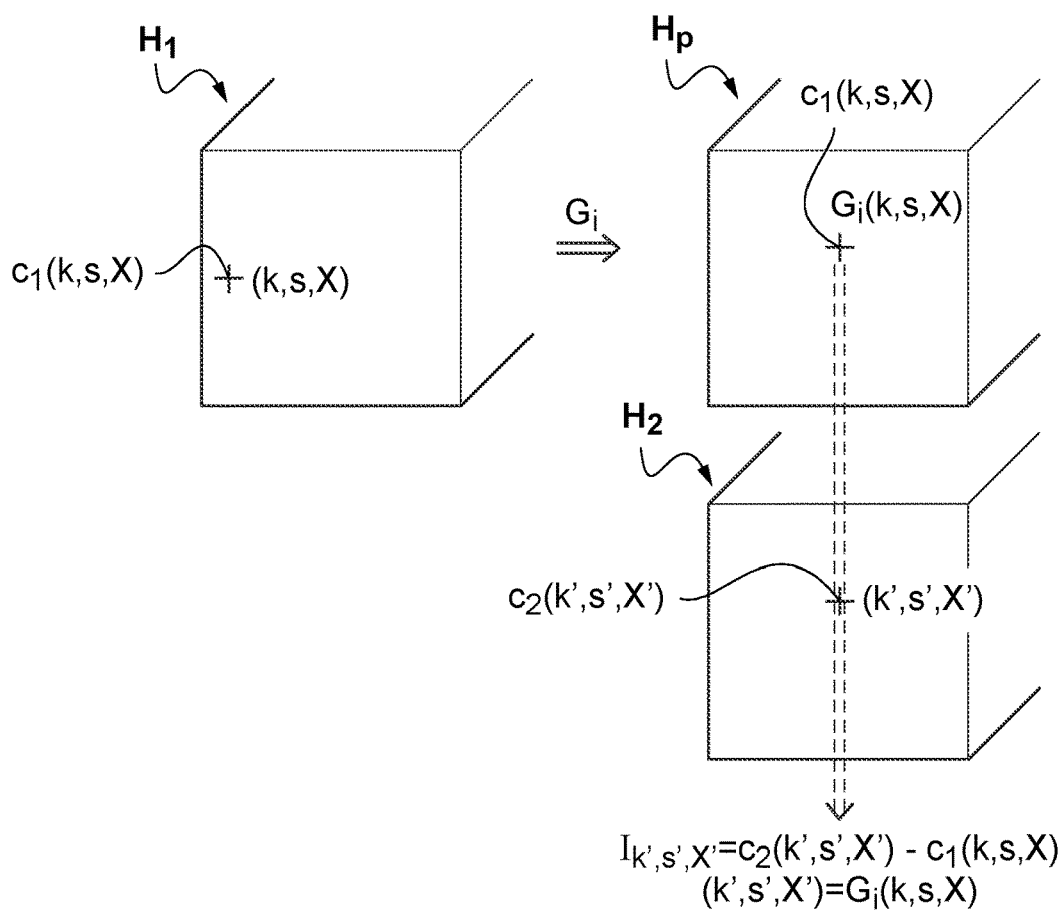
Figure 5:
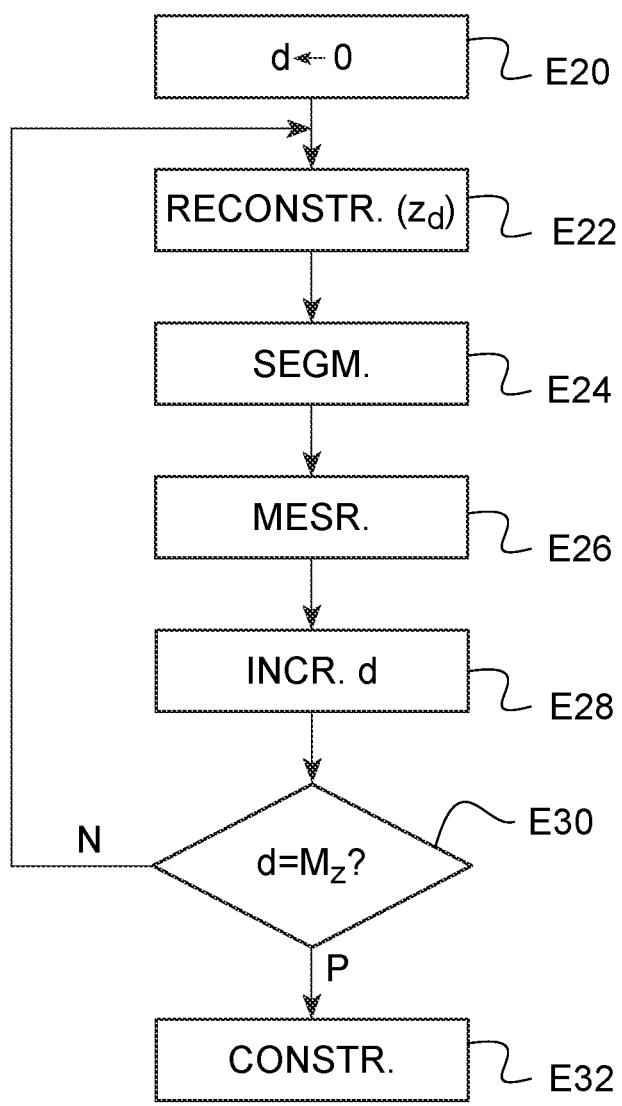

FIG. 4 schematically shows the calculation of the residuals during the encoding; and FIG. 5 illustrates steps of a method for constructing a depth map from a digital hologram.

DESCRIPTION OF THE PREFERRED EMBODIMENTS

Figure 1:
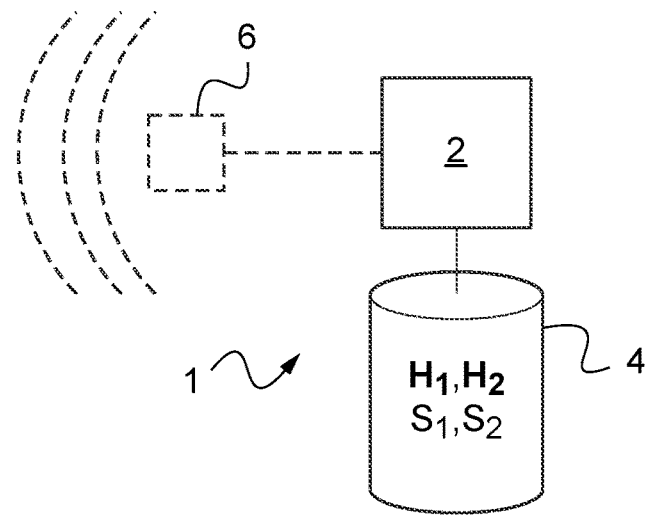
FIG. 1 illustrates an encoding device according to an exemplary embodiment of the invention.

The encoding device 1 of FIG. 1 comprises a processor 2 and a storage device 4 (such as a hard drive or a memory). The encoding device 1 can also comprise a communication circuit 6 allowing the processor 2 to exchange data with an external electronic device (not shown).

The storage device 4 stores at least two digital holograms $H_1$, $H_2$ (each represented by a set of coefficients, as explained hereinafter) belonging to a digital hologram sequence (this sequence being intended to reproduce the evolution over time of a given three-dimensional scene).

In the example described herein, the storage device 4 further stores a three-dimensional representation $S_1$; $S_2$ of the three-dimensional scene represented by each of the digital holograms $H_1$, $H_2$. However, as an alternative, no three-dimensional representation of the scene could be present within the encoding device 1. This is in particular the case when the digital holograms $H_1$, $H_2$ are received by the encoding device 1, via the communication circuit 6.

Indeed, the digital holograms $H_1$, $H_2$ can in practice be constructed (previously to the encoding method described hereinafter) within the encoding device 1 on the basis of the three-dimensional representations $S_1$, $S_2$ (as described, for example, in the above-mentioned article "*View-dependent compression of digital hologram based on matching pursuit*"), or be received from an external electronic device.

The storage device 4 also stores computer program instructions designed to implement a method as described hereinafter with reference to FIG. 2 when these instructions are executed by the processor 2.

In the following of the description, the context considered is that shown in FIG. 3: using a reference system (O, x, y, z), the digital holograms $H_1$, $H_2$ are defined in the plane of equation $z=0$.

The digital holograms $H_1$, $H_2$ are here respectively represented by two sets of real coefficients $c_1(k,s,X)$, $c_2(k,s,X)$, each coefficient $c_1(k,s,X)$, $c_2(k,s,X)$ being associated with a Gabor-Morlet wavelet $\Psi_{k,s,X}$ defined by the parameters $k$, $s$, $X$, where

Figure 3:
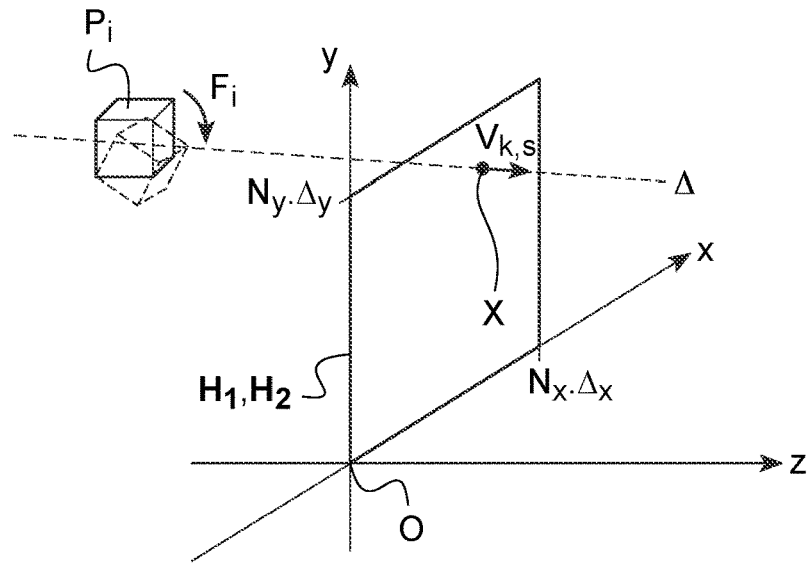
FIG. 3 illustrates the relative positioning of a digital hologram and of the scene that is represented by this digital hologram.

- k is a parameter (integer) that defines the wavelet orientation $\theta_k$, with $\theta_k=2\pi k/N$ (k varying between 0 and N−1);
- s is a parameter (integer) that defines the spatial frequency dilation (s varying between 1 and a);
- X is a couple of integers that define respectively the two-dimensional spatial coordinates in the plane of the digital hologram (that is to say the plane (O, x, y) in FIG. 3), with $X \in [0,N_x[\times[0,N_y[$.

The values N, a, $N_x$ and $N_y$ are fixed for the representation considered.

In other words, each Gabor-Morlet wavelet $\Psi_{k,s,X}$ is defined by a multiplet of coordinates k, s, X in a multidimensional space (here, four-dimensional).

Hereinafter, the coefficients $c_1(k,s,X)$ representing the digital hologram $H_1$ will be called "first coefficients" and the coefficients $c_2(k,s,X)$ representing the digital hologram $H_2$ will be called "second coefficients".

The first and second component of X will be respectively denoted $X_x$ and $X_y$.

The digital holograms $H_1$, $H_2$ could thus be reconstructed as follows:

$$H_1 = \sum_{k,s,X} c_1(k, s, X) \cdot \Psi_{k,s,X}$$

$$H_2 = \sum_{k,s,X} c_1(k, s, X) \cdot \Psi_{k,s,X}$$

(the summing being made for all the integers k between 0 and N−1, for all the integers s between 1 and a and for all the couples X of integers in $[0,N_x[\times[0,N_y[$), with $\Psi_{k,s,X}$ the function defined by $\Psi_{k,s,Z}(Y)=1/s \cdot \Phi(R_k^{-1}[(Y-\eta_x)/(s \cdot \Delta_s)])$ for $Y \in \mathbb{R}^2$, where $\eta_x=(X_x \cdot \Delta_x, X_y \cdot \Delta_y)$, $\Delta_x$ and $\Delta_y$ and $\Delta_s$ denote discretization pitches of, respectively, the first spatial component in the plane of the hologram, the second spatial component in the plane of the hologram and the spatial frequency dilation, $\Phi(A)=\exp(|A|^2/2) \cdot \exp(2i\pi A_x f)$ for $A \in \mathbb{R}^2$, where $|A|$ and $A_x$ respectively denote the norm (or module) of A and the first component thereof, exp is the exponential function ($\exp(p)=e^p$), f is a parameter (predefined for the representation concerned) and $$R_k = \begin{pmatrix} \cos\left(\frac{2\pi k}{N}\right) & -\sin\left(\frac{2\pi k}{N}\right) \\ \sin\left(\frac{2\pi k}{N}\right) & \cos\left(\frac{2\pi k}{N}\right) \end{pmatrix}.$$

An example of encoding method in accordance with the invention will now be described with reference to FIG. 2. This method is aimed at a differential encoding of the digital hologram $H_2$ on the basis of the digital hologram $H_1$. In this differential encoding, the digital hologram $H_1$ is used as the reference digital hologram.

This method here starts by a step E2 of segmenting the coefficients into sets of coefficients $E_i$ respectively associated with parts $P_i$ of the scene (which amounts to grouping the wavelets $\Psi_{k,s,X}$ into groups of wavelets respectively associated with these parts $P_i$ of the scene).

Each part $P_i$ of the scene is formed by a set of points of a same region liable to have a similar movement. Such a part $P_i$ of the scene is hereinafter called "connected component". In practice, it is for example an object of the scene.

In the example described herein, the connected components $P_i$ are for example identified on the basis of the three-dimensional representation $S_1$ of the scene (three-dimensional representation corresponding to the digital hologram $H_1$).

As an alternative, the connected components $P_i$ can be reconstructed from a digital hologram (here $H_1$), for example by means of a depth map, as described hereinafter.

In step E2, for each coefficient $c_1(k,s,X)$ of the digital hologram $H_1$, it is determined which part $P_i$ (or connected component) of the scene is passed through by a straight line $\Delta$ (representing a light ray associated with the wavelet $\Psi_{k,s,X}$) passing through the point of coordinates X (in the plane of the digital hologram) and oriented along the direction vector $V_{k,s}$ of coordinates:

$(\cos[\theta_k] \cdot \sin[\varphi_s], \sin[\theta_k] \cdot \sin[\varphi_s], \cos[\varphi_s])$, with $\varphi_s=\arcsin(\lambda f/(s \cdot \Delta s))$ (where $\lambda$ is the reference wavelength of the digital hologram).

The coefficient $c_1(k,s,X)$ is then placed in the set $E_i$ associated with the part $P_i$ passed through by this straight line $\Delta$.

Hence, a plurality of sets $E_i$ is constructed, each set $E_i$ comprising coefficients $c_1(k,s,X)$ associated with wavelets $\Psi_{k,s,X}$ that model light rays having an intersection with the part $P_i$ associated with the set $E_i$ concerned. In other words, each set $E_i$ corresponds to a group of wavelets $\Psi_{k,s,X}$ that model light rays having an intersection with the part $P_i$ associated with the set $E_i$ concerned.

In certain embodiments (for example, when the scene contains a single object, i.e. a single connected component $P_1$), the segmentation step E2 could be omitted. It is considered in this case hereinafter that a single set $E_i$ of coefficients (herein the set $E_1$) is processed.

Figure 2:
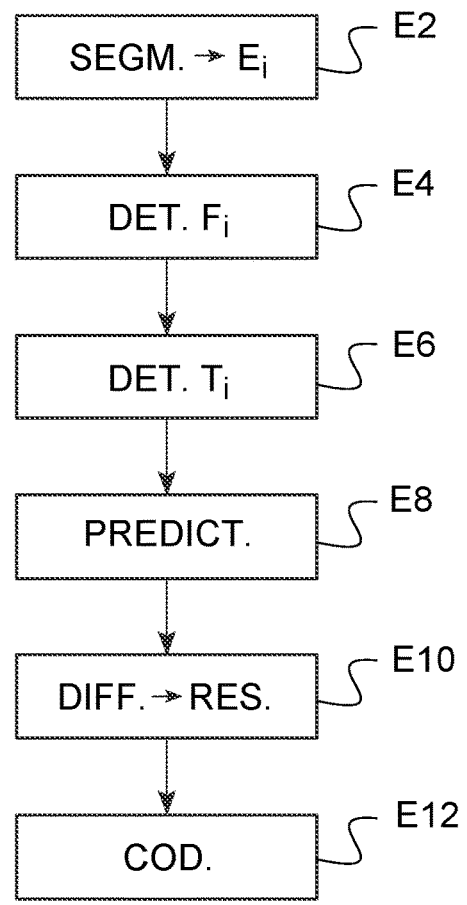
FIG. 2 illustrates steps of an encoding method in accordance with the teachings of the invention.

The method of FIG. 2 continues with a step E4, in which a rigid transform $F_i$ is determined for each connected component (or part) $P_i$ of the scene.

This rigid transform $F_i$ is for example determined by analyzing the movement of the connected component $P_i$ between the scene represented by the hologram $H_1$ and the scene represented by the hologram $H_2$.

This movement analysis is for example made by comparing the three-dimensional representation $S_1$ (scene represented by the digital hologram $H_1$) and the three-dimensional representation $S_2$ (scene represented by the digital hologram $H_2$). On this subject, reference will be made for example to the article "*A Hierarchical Method for 3D Rigid Motion Estimation*", by Srinark T., Kambhamettu C., Stone M. in Computer Vision—ACCV 2006. ACCV 2006 Lecture Notes in Computer Science, vol 3852. Springer, Berlin, Heidelberg.

As an alternative, this movement analysis could be made by comparing a first depth map derived (as explained hereinafter) from the digital hologram $H_1$ and a second depth map derived (as explained hereinafter) from the digital hologram $H_2$. Such depth maps allow coming down to the above-mentioned three-dimensional case.

For each connected component $P_i$, the rigid transform $F_i$ is classically decomposed into a translation $t^i = (t^i_x, t^i_y, t^i_z)$ and a rotation $r^i$ that can be written (using the Euler angles) in matrix form, by means of the three following matrices:

$$R^i_x = \begin{pmatrix} 1 & 0 & 0 \\ 0 & \cos\alpha_i & -\sin\alpha_i \\ 0 & \sin\alpha_i & \cos\alpha_i \end{pmatrix}$$

$$R^i_y = \begin{pmatrix} \cos\beta_i & 0 & \sin\beta_i \\ 0 & 1 & 0 \\ -\sin\beta_i & 0 & \cos\beta_i \end{pmatrix}$$

$$R^i_z = \begin{pmatrix} \cos\gamma_i & -\sin\gamma_i & 0 \\ \sin\gamma_i & \cos\gamma_i & 0 \\ 0 & 0 & 1 \end{pmatrix}$$

The method of FIG. 2 then comprises a step E6 of determining, for each set $E_i$ of coefficients, a linear transform $T_i$ of the space-frequency domain on the basis of the rigid transform determined at step E4 for the connected component $P_i$ associated with the set $E_i$ concerned.

In the example described herein, the linear transform $T_i$ is defined as follows (on the basis of the corresponding rigid transform $F_i$):

$$\Omega_i = \begin{pmatrix} \cos\gamma_i & -\sin\gamma_i & 0 & 0 \\ \sin\gamma_i & \cos\gamma_i & 0 & 0 \\ 0 & 0 & \cos\gamma_i & -\sin\gamma_i \\ 0 & 0 & \sin\gamma_i & \cos\gamma_i \end{pmatrix}$$

$$\tau_i = \begin{pmatrix} I_2 & \frac{2t^i_z}{\lambda} I_2 \\ 0 & I_2 \end{pmatrix}$$

$$b_i = \begin{pmatrix} t^i_x \\ t^i_y \\ \alpha_i \\ \beta_i \end{pmatrix}$$

$$T_i: \mathbb{R}^4 \to \mathbb{R}^4, w \mapsto \Omega_i \tau_i w + b_i$$

where $\lambda$ is the already mentioned reference wavelength and $I_2$ the identity matrix with 2 rows and 2 columns.

The method of FIG. 2 then comprises, at step E8, constructing a predicted digital hologram $H_p$ as a function of the digital hologram $H_1$ and by means of the linear transforms $T_i$ determined at step E6.

For that purpose, for each coefficient $c_1(k,s,X)$ associated with a wavelet $\Psi_{k,s,X}$ defined by the multiplet $(k,s,X)$ within the digital hologram $H_1$, it is determined to which wavelet $\Psi_{k',s',X'}$ applies this coefficient $c_1(k,s,X)$ within the predicted hologram $H_p$ by means of the transform $T_i$ associated with the set $E_i$ containing this coefficient $c_1(k,s,X)$:

Considering $\Sigma_1 = f \cdot [\cos(\theta_k)]/(s \cdot \Delta_s)$, $\xi_2 = f \cdot [\sin(\theta_k)]/(s \cdot \Delta_s)$ and $\eta = (\eta_x, \eta_y) = (X_x \cdot \Delta_x, X_y \cdot \Delta_y)$, we calculate $$\begin{pmatrix} \eta' \\ \xi'_1 \\ \xi'_2 \end{pmatrix} = T_i \left[ \begin{pmatrix} \eta \\ \xi_1 \\ \xi_2 \end{pmatrix} \right]$$

and, considering $\theta' = \text{atan } 2(\xi_1, \xi_2)$, then:

k'=ent(Nθ'/2π), where ent is the function "integer part", s'=ent(f/[SQRT($\xi'^2_1 + \xi'^2_2$)·$\Delta_s$]) and X'=(ent($\eta'_x/\Delta_x$), ent ($\eta'_y/\Delta_y$), with $\eta' = (\eta'_x, \eta'_y)$.

In other words, for each set $E_i$ of coefficients, it is defined (as just indicated), using the transform $T_i$ associated with this set $E_i$, a transform $G_i$ in the multidimensional space (here four-dimensional) such that a coefficient $c_1(k,s,X)$ belonging to the set $E_i$ and applied to the wavelet $\Psi_{k,s,X}$ in the digital hologram $H_1$ is applied to the wavelet $\Psi_{Gi(k,s,X)}$ in the predicted digital hologram $H_p$, as schematically illustrated in FIG. 4. (We hence have: (k',s',X')=$G_i$(k,s,X).)

This transform $G_i$ is thus the transform that corresponds, in the multidimensional space of the wavelet definition coordinates, to the rigid transform $F_i$ of the connected component $P_i$. This linear transform Gi is valid for the coefficients of the set $E_i$ associated with this connected component $P_i$.

The predicted digital hologram $H_p$ can thus be written:

$$H_p = \sum_{k,s,X} c_1(k, s, X) \cdot \Psi_{Gi(k,s,X)}$$

In this summing, no account will be taken of the coefficients $c_1(k,s,X)$ for which the image $G_i(k,s,X)$ is out of the domain of the values used in the representation concerned, that is to say, here, out of the following part of the multidimensional space: [0,N−1]x[1,a]x[0,$N_x$[x[0,$N_y$[. These coefficients indeed correspond to rays that exit from the digital hologram frame.

The method of FIG. 2 then comprises a step E10 of determining a set of residuals by difference between the digital hologram $H_2$ (the digital hologram to be encoded) and the digital hologram $H_p$ predicted on the basis of the digital hologram $H_1$ (reference digital hologram).

Precisely, for each coefficient $c_2(k',s',X')$ of the digital hologram $H_2$ (this coefficient being relative to a wavelet $\Psi_{k',s',X'}$ defined by the multiplet $(k',s',X')$), it is determined a residual $I_{k',s',X'}$ by difference between this coefficient $c_2(k', s',X')$ and the coefficient relative to the same wavelet $\Psi_{k',s',X'}$ in the predicted digital hologram $H_p$, i.e. $c_1(k,s,X)$, as illustrated in FIG. 4, with $(k',s',X')=G_i(k,s,X)$ as already indicated. We hence have:

$$I_{k',s',X'} = c_2(k', s', X') - c_1(k, s, X).$$

Each residual is hence determined by difference between a coefficient $c_2(k',s',X')$, associated (in the digital hologram $H_2$) with the wavelet $\Psi_{k',s',X'}$ defined by the multiplet $(k',s', X')$, and a coefficient $c_1(k,s,X)$ associated, in the digital hologram $H_1$, to a wavelet $\Psi_{k,s,X}$ defined by a multiplet $(k,s,X)$ having for image the multiplet $(k',s',X')$ by the transform $G_i$ associated with the set $E_i$ comprising the coefficient $c_1(k,s,X)$.

The method of FIG. 2 finally comprises a step E12 of encoding the residuals $I_{k',s',X'}$.

For example, this can be done as follows:
ordering the residuals $I_{k',s',X'}$ in a predetermined order of the multiplets $(k',s',X')$;
entropy encoding to the ordered residuals using a method of the Huffman encoding or arithmetic encoding type.

In the just described example, the differential encoding of the digital hologram $H_2$ is made with reference to a single digital hologram $H_1$. As an alternative, it could be provided to encode the digital hologram $H_2$ with reference to two digital holograms respectively located before and after the digital hologram $H_2$ in the digital hologram sequence.

In this case, the value of the bidirectionally predicted coefficients can be equal to the mean of the coefficients predicted from said two digital holograms.

For example, if $H_3$ denotes a digital hologram posterior to the digital hologram $H_2$ in the digital hologram sequence and $c_3$ the coefficients of this digital hologram $H_3$, the residual will be defined by:

$$I_{k',s',X'} = c_2(k', s', X') - (c_1(k, s, X) + c_3(k'', s'', X''))/2,$$

where, as previously, $(k',s',X')=G_i(k,s,X)$ and where $(k', s',X')=G'_i(k'',s'',X'')$, with $G'_i$ a transform defined similarly to the transform $G_i$, but this time on the basis of a rigid transform $F'_i$ determined as a function of the evolution of a connected component $P_i$ of the scene represented by the digital hologram $H_3$ to the scene represented by the digital hologram $H_2$.

FIG. 5 illustrates steps of a method for constructing a depth map from a digital hologram H (as already indicated, this method can be applied to the hologram $H_1$ and/or to the hologram $H_2$).

The depth is here understood in the direction (Oz).

Let's denote $M_x$ and $M_y$ the horizontal and vertical resolutions desired for the depth map, and $M_z$ the number of levels of the depth map.

Let's finally denote $z_{min}$ and $z_{max}$ the minimum and maximum values of the z coordinate in the scene (these values being predefined).

The method of FIG. 5 starts with a step E20 in which a variable d is initialized to the value 0.

The method then comprises a step E22 of reconstructing the light field U at the depth $z_d = d \cdot (z_{max} - z_{min})/M_z + z_{min}$, for example using the propagation of the angular spectrum:

$$U = F^{-1}\{F(H).\exp(2\pi i z_d.SQRT[\lambda^{-2} - f_x^2 - f_y^2])\},$$

where SQRT is the square root function, F and $F^{-1}$ are respectively the direct and inverse Fourier transforms, and $f_x$ and $f_y$ are the frequency coordinates of the hologram in the Fourier domain.

The method then comprises a step E24 of segmenting the reconstructed field U into $M_x \cdot M_y$ segments (rectangular), each segment having a horizontal resolution $K_x$ and a vertical resolution $K_y$. (The field reconstructed thanks to the hologram H at a horizontal resolution $N_x$ and a vertical resolution $N_y$, as already indicated, and we have thus: $M_x \cdot K_x = N_x$ et $M_y \cdot K_y = N_y$.)

The method then comprises a step E26 of calculating a sharpness metric v for each of the segments obtained at step E24. If each segment is indexed by a horizontal index i and a vertical index j, the value v[i,j,d] of the sharpness metric is calculated for each segment of indices i, j, here by means of the normalized variance:

$$v[i, j, d] = (1/M_x, M_y.\mu[i, j]).\sum_{n,m}(|U[i.K_x + n, j.K_y + m]|^2 - \mu[i, j])^2$$

where is the mean intensity of the field of the segment concerned:

$$\mu[i, j] = (1/M_x.M_y).\sum_{n,m}|U[i.K_x + n, j.K_y + m]|^2.$$

As an alternative, another sharpness metric can be used, for example one of the metrics mentioned in the article "*Comparative analysis of autofocus functions in digital in-line phase-shifting holography*", by E. S. R. Fonseca, P. T. Fiadeiro, M. Pereira, and A. Pinheiro in Appl. Opt., AO, vol. 55, no. 27, pp. 7663-7674, September 2016.

(Such a sharpness metric calculation is performed for all the segments, i.e. for any i between 0 et $M_x - 1$ and for any j between 0 and $M_y - 1$.)

The processing related to the depth $z_d$ associated with the current variable d is then finished.

The method then comprises a step E28 of incrementing the variable d and a step E30 of testing the equality between the current value of the variable d and the number $M_z$ of levels of the depth map.

In case of equality (arrow P), all the levels have been processed and the method continues at step E32 described hereinafter.

In the absence of equality, at step E30 (arrow N), the method loops to step E22 for processing the depth level $z_d$ corresponding to the (new) current value of the variable d.

The method can then construct, at step E32, the depth map D by choosing, for each element of the map (here indexed by the indices i, j), the depth (here denoted D[i,j]) for which the sharpness metric is maximum (among the different segments aligned along the axis Oz, here all of indices i, j, and respectively associated with the different depths for d varying from 0 to $M_z - 1$). With the notations already used, we have:

$$D[i, j] = \mathrm{argmax}_d v[i, j, d].$$

A depth value D[i,j] is hence obtained for all the elements of the depth map D, i.e. here for any i between 0 and $M_x-1$ and for any j between 0 and $M_y-1$.

The so-obtained depth map D can be used, as already mentioned, to determine the connected components (or parts) $P_i$ of the scene, for example by means of a partitioning algorithm (or "clustering algorithm").

A k-means algorithm can be used for that purpose, as described for example in the article "*Some methods for classification and analysis of multivariate observations*", by MacQueen, J. in Proceedings of the Fifth Berkeley Symposium on Mathematical Statistics and Probability, Volume 1: Statistics, 281-297, University of California Press, Berkeley, Calif., 1967.

In this case, the partitioning algorithm makes it possible to group the connected segments (here of indices i, j) of close depth values (here D[i,j]), the so-produced groups forming the connected components $P_i$.

The invention claimed is:

1. A method for encoding a sequence comprising at least a first digital hologram representing a first scene and a second digital hologram representing a second scene, the first digital hologram and the second digital hologram being represented by a set of wavelets, each of the wavelets being defined by a multiplet of coordinates in a multidimensional space,
   the first digital hologram being represented by a set of first coefficients respectively associated with at least certain of the wavelets of said set of wavelets and the second digital hologram being represented by a set of second coefficients respectively associated with at least certain of the wavelets of said set of wavelets,
   the encoding method comprising the following steps:
   for each given one of a plurality of the second coefficients, determining a residual as a difference between
   the given second coefficient, associated with a first said wavelet defined by a given said multiplet, and
   the first coefficient associated with a second said wavelet defined by a said multiplet having for image the given said multiplet by a transform in the multidimensional space; and
   encoding the determined residuals,
   wherein the transform is determined by analysis of variation between the first scene represented by the first digital hologram and the second scene represented by the second digital hologram.

2. The method according to claim 1, wherein said variation corresponds to movement of an object between the first scene and the second scene.

3. The method according to claim 2, further comprising, for at least one given said second coefficient outside of said of the second plurality coefficients, a step of determining a residual as a difference between
   the given said second coefficient, associated with a third said wavelet defined by another given said multiplet, and
   the first coefficient associated with a fourth said wavelet defined by another said multiplet having for image said another given multiplet by another transform in the multidimensional space.

4. The method according to claim 2, wherein the transform is determined as a function of a movement, between the first scene and the second scene, of a set of connected points.

5. The method according to claim 2, wherein the transform is determined on the basis of three-dimensional representations of the first scene and the second scene.

6. The method according to claim 1, further comprising, for at least one given said second coefficient outside of said plurality of the second coefficients, a step of determining a residual as a difference between
   the given said second coefficient, associated with a third said wavelet defined by another given said multiplet, and
   the first coefficient associated with a fourth said wavelet defined by another said multiplet having for image said another given multiplet by another transform in the multidimensional space.

7. The method according to claim 6, wherein said another transform is determined by analysis of another variation between the first scene and the second scene.

8. The method according to claim 7, further comprising the following steps:
   distributing at least a part of the wavelets into different groups of said wavelets respectively associated with different parts of the first scene or the second scene;
   determining a transform of the multidimensional space for each said group of the wavelets;
   for each given one of the second coefficients of a given said group of the wavelets, determining a residual as a difference between
   the given said second coefficient, associated with a fifth said wavelet defined by a given said multiplet, and
   the first coefficient associated with a sixth said wavelet defined by a said multiplet having for image this given multiplet by the transform associated with the given group of the wavelets.

9. The method according to claim 7, wherein the transform is determined as a function of a movement, between the first scene and the second scene, of a set of connected points.

10. The method according to claim 6, further comprising the following steps:
    distributing at least a part of the wavelets into different groups of said wavelets respectively associated with different parts of the first scene or the second scene;
    determining a transform of the multidimensional space for each said group of the wavelets;
    for each given one of the second coefficients of a given said group of the wavelets, determining a residual as a difference between
    the given said second coefficient, associated with a fifth said wavelet defined by a given said multiplet, and
    the first coefficient associated with a sixth said wavelet defined by a said multiplet having for image this given multiplet by the transform associated with the given group of the wavelets.

11. The method according to claim 10, wherein the transform is determined as a function of a movement, between the first scene and the second scene, of a set of connected points.

12. The method according to claim 6, wherein the transform is determined as a function of a movement, between the first scene and the second scene, of a set of connected points.

13. The method according to claim 6, wherein the transform is determined on the basis of three-dimensional representations of the first scene and the second scene.

14. The method according to claim 1, wherein the transform is determined as a function of a movement, between the first scene and the second scene, of a set of connected points.

15. The method according to claim 1, wherein the transform is determined on the basis of three-dimensional representations of the first scene and the second scene.

16. The method according to claim 1, further comprising the following steps:
constructing a first depth map by means of the first digital hologram;
constructing a second depth map by means of the second digital hologram;
determining the transform on the basis of the first depth map and the second depth map.

17. The method according to claim 16, wherein, depth being defined along a given direction, the step of constructing the first depth map comprises the following steps:
reconstructing, by means of the first digital hologram, a light field at a plurality of points;
for each given one of a plurality of depths, segmenting those of the plurality of points that are associated with the given depth into a plurality of segments, and determining values of a sharpness metric respectively associated with said segments on the basis of the light field reconstructed on a respective said segment;
for each element of the first depth map, determining a depth for which the sharpness metric is maximum among a set of the segments aligned along said given direction and respectively associated with depths of the plurality of depths.

18. The method according to claim 1, wherein the coordinates of said multidimensional space represent respectively a parameter representative of a first spatial coordinate in a plane of the hologram, a parameter representative of a second spatial coordinate in the plane of the hologram, a spatial frequency dilation parameter (s) and an orientation parameter.

19. A device for encoding a sequence comprising at least a first digital hologram representing a first scene and a second digital hologram representing a second scene, the first digital hologram and the second digital hologram being represented by means of a set of wavelets, each of the wavelets being defined by a multiplet of coordinates in a multidimensional space, the encoding device comprising:
a unit for storing a set of first coefficients, respectively associated with at least certain of the wavelets of said set of wavelets, and a set of second coefficients, respectively associated with at least certain of the wavelets of said set of wavelets, the set of first coefficients representing the first digital hologram and the set of second coefficients representing the second digital hologram;
a unit for determining, for each given one of a plurality of the second coefficients, a residual as a difference between
the given second coefficient, associated with a first said wavelet defined by a given said multiplet, and
the first coefficient associated with a second said wavelet defined by a said multiplet having for image the given said multiplet by a transform in the multidimensional space; and
a unit for encoding the determined residuals,
wherein the unit for determining is designed to determine the transform by analysis of variation between the first scene represented by the first digital hologram and the second scene represented by the second digital hologram.

20. The device according to claim 19, wherein said variation corresponds to movement of an object between the first scene and the second scene.

* * * * *